(12) United States Patent
Zwanenburg

(10) Patent No.: US 7,358,961 B2
(45) Date of Patent: Apr. 15, 2008

(54) USER INTERFACE FOR CONTROLLING LIGHT EMITTING DIODES

(75) Inventor: Michel J. Zwanenburg, Northville, MI (US)

(73) Assignee: Koninklijke Philips Electronics N.V., Eindhoven (NL)

(*) Notice: Subject to any disclaimer, the term of this patent is extended or adjusted under 35 U.S.C. 154(b) by 148 days.

(21) Appl. No.: 10/555,678

(22) PCT Filed: Apr. 22, 2004

(86) PCT No.: PCT/IB2004/001352

§ 371 (c)(1),
(2), (4) Date: Nov. 4, 2005

(87) PCT Pub. No.: WO2004/100613

PCT Pub. Date: Nov. 18, 2004

(65) Prior Publication Data

US 2006/0290710 A1 Dec. 28, 2006

Related U.S. Application Data

(60) Provisional application No. 60/468,552, filed on May 7, 2003.

(51) Int. Cl.
*G06F 3/041* (2006.01)

(52) U.S. Cl. ............... 345/173; 345/156; 345/594; 315/363

(58) Field of Classification Search ........ 315/291, 315/294, 312, 316, 362, 169.3, 363; 345/418, 345/594, 204, 214, 156, 173; 362/227, 230, 362/231, 800
See application file for complete search history.

(56) References Cited

U.S. PATENT DOCUMENTS

| | | | | |
|---|---|---|---|---|
| 6,305,818 B1* | 10/2001 | Lebens et al. | ............... | 362/800 |
| 6,342,897 B1 | 1/2002 | Wen | | |
| 6,508,564 B1 | 1/2003 | Kuwabara et al. | | |
| 7,064,498 B2* | 6/2006 | Dowling et al. | ............. | 315/291 |
| 2002/0030449 A1 | 3/2002 | Okazaki et al. | | |
| 2002/0067144 A1 | 6/2002 | Hoffknecht et al. | | |
| 2005/0040772 A1* | 2/2005 | Guzman et al. | ............. | 315/291 |

FOREIGN PATENT DOCUMENTS

| | | |
|---|---|---|
| EP | 1109147 A1 | 6/2001 |
| GB | 2358296 A | 7/2001 |
| WO | WO01/36864 A2 | 5/2001 |

* cited by examiner

*Primary Examiner*—Thuy V. Tran
*Assistant Examiner*—Ephrem Alemu

(57) ABSTRACT

A LED lighting system (100) employing a LED light source (115), a user interface (124, 128, 134, 138), and a controller (112). The LED light source (115) includes a plurality of colored LEDs emitting one of a plurality of spectral outputs as a function of one or more currents flowing through the colored LEDs, where each current has a variable time average flow. The user interface (124, 128, 134, 138) facilitate a user selection of one of the spectral outputs. The controller (112) controls the variable time average flow of each current flowing through the colored LEDs as a function of the spectral output selected by the user.

18 Claims, 3 Drawing Sheets

USER INTERFACE FOR CONTROLLING LIGHT EMITTING DIODES

CROSS REFERENCE TO RELATED APPLICATION

This application claims the benefit of U.S. provisional application Ser. No. 60/468,552, filed May 7, 2003, which the entire subject matter is incorporated herein by reference.

In general, the present invention relates to light-emitting diode ("LED") light sources. More specifically, the present invention relates to user interfaces for facilitating user control of a spectral output of a LED light source.

Most artificial light is produced by an electric discharge through a gas in a lamp. One such lamp is the fluorescent lamp. Another method of creating artificial light includes the use of a LED, which provides a spectral output in the form of a radiant flux that is proportional to a forward current flowing through the LED. Additionally, a LED light source can be used for generation of a multi-spectral light output.

Conventional LED light sources utilize individual encapsulated light emitting diodes or groups of light emitting diodes of substantially similar spectral characteristics encapsulated as a unit. Typically, conventional LED light sources are implemented as color converted LED light sources. Color corrected LED light sources are manufactured by applying a phosphor compound layer to a LED, either directly or within an encapsulent. The phosphor layer absorbs the light emitted by the LED or a portion of the light emitted by the LED and emits light based on an interaction of the absorbed light and the phosphor compound. The color corrected LED light sources are grouped together to form the LED light source. Color corrected LEDs realize maximum accuracy in spectral output when a specified amount of direct current is applied to the color corrected LEDs. The specified amount of direct current, among other data, is included in a rating for each color corrected LED.

It is a difficult problem to combine and maintain correct proportions of light from multi-colored LEDs to create light that is of desired color and intensity as well as reasonable spatial uniformity, because LED spectra and efficiencies change with current, temperature and time. In addition, LED properties vary from LED to LED, even from a single manufacturing batch. As LED manufacturing improves with time, LED-to-LED variations may become smaller, but LED variations with temperature, current, and time are fundamental to the semiconductor devices. Historically, conventional control systems adjust intensity levels of spectral output by increasing or decreasing the number of LEDs receiving the specified amount of direct current. There are several disadvantages associated with this type of direct current regulation, such as, for example inaccuracy of a desired spectral output.

The present invention overcomes these drawbacks of the prior art with a new and unique touch screen-interface for facilitating user control of a spectral output and an intensity of a LED light source with a greater degree of accuracy than the prior art.

One form of the present invention is a LED lighting system employing a LED light source, a user interface, and a controller. The LED light source includes a plurality of colored LEDs emitting one of a plurality of spectral outputs as a function of one or more currents flowing through the colored LEDs, where each current has a variable time average flow. The user interface facilitates a user selection of one of the spectral outputs. The controller controls the variable time average flow of each current flowing through the colored LEDs as a function of the spectral output selected by the user.

The foregoing form and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

Figure 1:
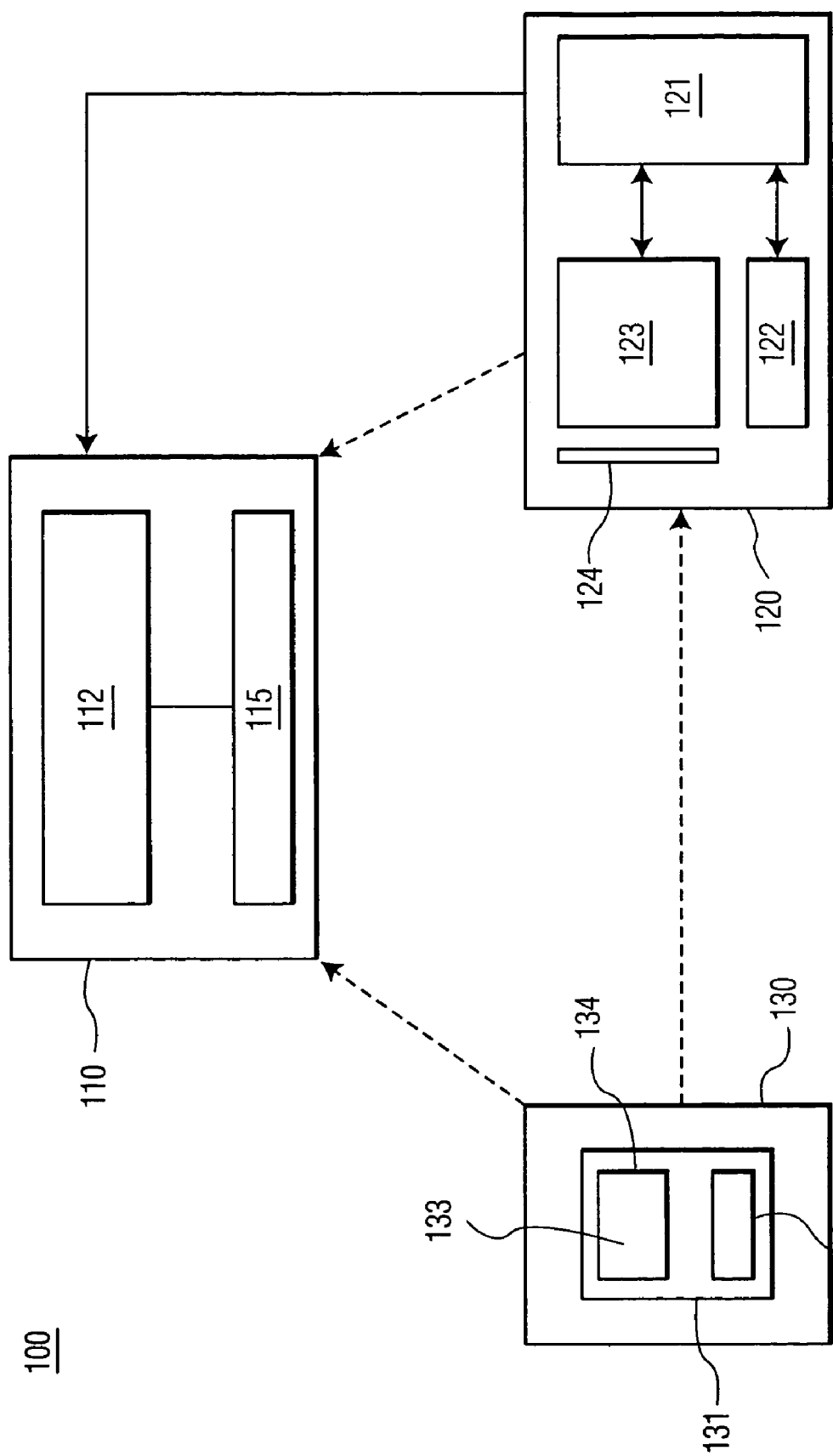
FIG. 1 illustrates one embodiment of a LED lighting system for controlling a spectral output of a LED light source in accordance with the present invention.

A lighting system 100 as illustrated in FIG. 1 includes a LED light source 110, a computer 120, and a portable computer 130. Lighting system 100 controls a spectral output of LED light source 110. Lighting system 100 may include additional components not relevant to the present discussion.

LED light source 110 includes a LED light source controller 112, and a conventional color LED lamp 115. LED light source controller 112 is capable of receiving/recognizing a control signal of any type from devices 120 and 130. As will be explained in further detailed in connection with FIG. 5, LED light source controller 112 is designed to receive the control signal from either device 120 or 130, and to provide one or more direct currents via an interface (e.g., a RS-232 serial interface) to LED lamp 115 based on the received control signal.

In one embodiment, LED light source controller 112 includes a power source. In this embodiment, LED light source controller 112 receives the control signal and provides direct current(s) to LED lamp 115 based on the received control signal. In another embodiment, LED light source controller 112 excludes a power source. In this embodiment, LED light source controller 112 receives a power control signal and provides direct currents to LED lamp 115 based on the received power control signal.

In another embodiment, LED light source controller 112 includes hardware and software enabling LED light source controller 112 to receive a wireless control signal. In this embodiment, LED light source controller 112 includes a power source. LED light source controller 112 receives the wireless control signal and provides direct current to LED lamp 115 based on the received wireless control signal.

LED lamp 115 represents one or more direct current driven light sources. Each LED lamp within LED lamp 115 includes a plurality of colored LEDs. In one embodiment, each LED lamp within LED lamp 115 includes a plurality of LEDs representing the colors red (R), green (G), and blue (B). In another embodiment, each LED lamp within LED lamp 115 includes a plurality of LEDs representing two of the colors red (R), green (G), or blue (B). The LEDs may be implemented in any suitable form, such as, for example color converted LEDs or direct emitting LEDs. In yet another embodiment, each LED lamp within LED lamp 115 includes a plurality of LEDs representing the colors red (R), green (G), blue (B), and amber (A).

Computer 120 includes a processor 121, an input device 122, and a user interface in the form of a graphical user interface 123 and a touch-screen 124. Computer 120 can be implemented as any suitable computer, such as, for example a personal computer so long as it includes graphical user interface 123 and touch screen 124. Processor 121 includes a processor (not shown) designed to receive data, process the received data, and produce a control signal based on the processed data. Processor 121 additionally includes a data interface designed to modify the control signal into a suitable format for communication operations, such as a wired data transfer as represented by the solid arrow extending from device 120 to source 110 or a wireless data transfer as represented by the dashed arrow extending from device 120 to source 110. Processor 121 receives user inputs from graphical user interface 123 and touch screen 124. In one embodiment, a user of system 100 communicates a desired spectral output to processor 121 utilizing graphical user interface 123 and touch screen 124. Touch screen 124 can be implemented as any suitable touch screen, such as, for example a resistive touch screen or a capacitive touch screen.

Portable computer 130 includes a processor 131, an input device 132, and a user interface in the form of a graphical user interface 133 and touch screen 134. Computer 130 can be implemented as any suitable computer, such as, for example a personal data assistant, tablet PC, notebook PC, so long as it includes a graphical user interface 133, a touch-screen 134, and a wireless capability compatible with LED light source controller 112 as well as computer 120. In one embodiment, processor 131 includes a processor designed to receive data, process the received data, and produce a data signal based on the processed data to be transmitted to computer 120. In another embodiment, processor 131 includes a processor designed to receive data, process the received data, and produce a control signal based on the processed data to be transmitted to LED light source controller 112. Processor 131 receives user input from graphical user interface 133 and touch screen 134. In one embodiment, a user of system 100 communicates spectral output and intensity information to processor 131 utilizing graphical user interface 133 and touch screen 134. Touch screen 134 can be implemented as any suitable touch screen, such as, for example a resistive touch screen or a capacitive touch screen.

Figure 2:
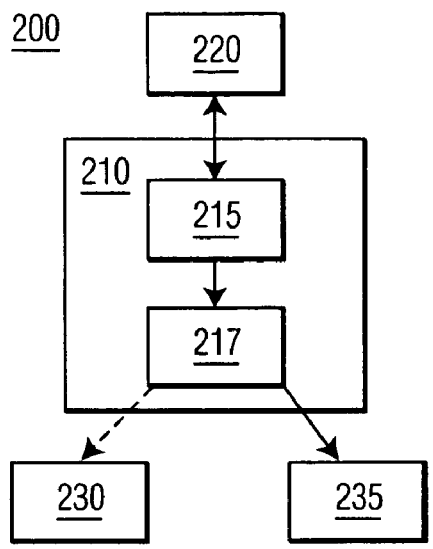
FIG. 2 illustrates a first embodiment in accordance with the present invention of the LED lighting system illustrated in FIG. 1.

FIG. 2 is a block diagram illustrating a system 200 for controlling a spectral output emitted from a LED light source. System 200 includes a controller 210, a user interface 220, a wireless color LED light source 230, and a wired LED light source 235. System 200 may include additional components not relevant to the present discussion.

Controller 210 includes a processor 215 and a data interface 217. User interface 220 is operably coupled to controller 210 and in communication with processor 215. In one embodiment, wireless color LED light source 230 is in wireless communication with controller 210 and in communication with data interface 217 as well. In another embodiment, wired LED light source 235 is operably coupled to controller 210 and in communication with data interface 217.

In operation, controller 210 receives user selections of spectral outputs via user interface 220 via a wired transmission. Processor 215 receives the user selections, processes the received user selections, and produces a control signal based on the processed user selection. Processor 215 sends the control signal to data interface 217 for transmission to one or both color LED light sources 230 and 235. In one embodiment, data interface 217 modifies the control signal into a suitable format for communication via wired data transfer. In another embodiment, data interface 217 modifies the control signal into a suitable format for communication via wireless data transfer. In an example and referring to FIG. 1 above, system 200 represents interaction between computer 120 LED and light source 110 based on user selections via graphical user interface 123 and touch screen 124 of computer 120.

Figure 3:
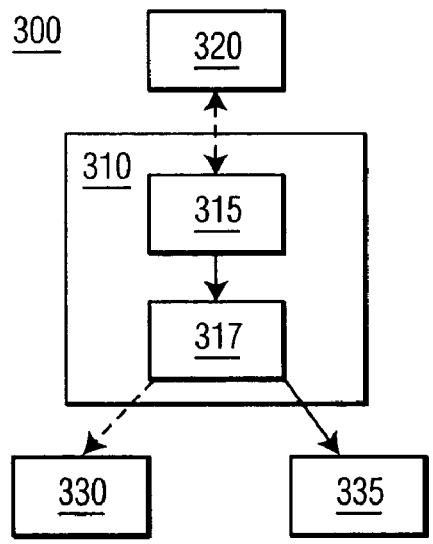
FIG. 3 illustrates a second embodiment in accordance with the present invention of the LED lighting system illustrated in FIG. 1.

FIG. 3 is a block diagram illustrating a system 300 for controlling a spectral output emitted from a LED light source. System 300 includes a controller 310, a user interface 320, a wireless color LED light source 330, and a wired LED light source 335. System 300 may include additional components not relevant to the present discussion.

Controller 310 includes a processor 315 and a data interface 317. User interface 320 is operably coupled to controller 310 and in communication with processor 315. In one embodiment, wireless color LED light source 330 is in wireless communication with controller 310 and in communication with data interface 317 as well. In another embodiment, wired LED light source 335 is operably coupled to controller 310 and in communication with data interface 317.

In operation, controller 310 receives user selections of spectral outputs via user interface 320 via a wireless transmission. Processor 315 receives the user selections, processes the received user selections, and produces a control signal based on the processed user selection. Processor 315 sends the control signal to data interface 317 for transmission to one or both color LED light sources 330 and 335. In one embodiment, data interface 317 modifies the control signal into a suitable format for communication via wired data transfer. In another embodiment, data interface 317 modifies the control signal into a suitable format for communication via wireless data transfer. In an example and referring to FIG. 1 above, system 300 represents interaction between computer 130 and light source 110 based on user selections via graphical user interface 133 and touch screen 134 of computer 130.

Figure 4:
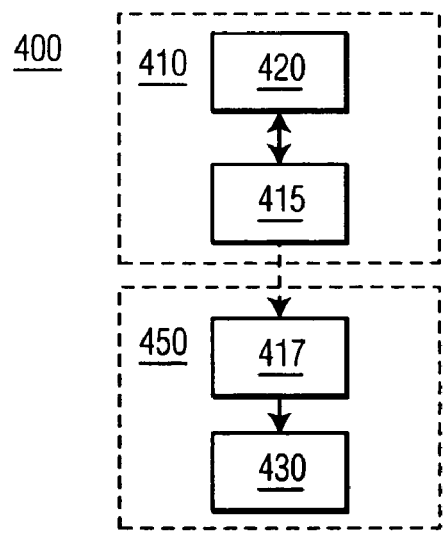
FIG. 4 illustrates a third embodiment in accordance with the present invention of the LED lighting system illustrated in FIG. 1.

FIG. 4 is a block diagram illustrating a system for controlling spectral output emitted from a LED light source. System 400 includes controller 410 and LED light source 450. System 400 may include additional components not relevant to the present discussion Controller 410 is in wireless communication with LED light source 450. Controller 410 includes user interface 420 and mobile processor 415. LED light source 450 includes data interface 417 and color LEDs 430. User interface 420 is coupled to mobile processor 415. Mobile processor 415 is in communication with data interface 417. Data interface 417 is in communication with color LEDs 430.

In operation, mobile processor 415 receives user selections of spectral outputs from user interface 420. Mobile processor 415 receives the user selections, processes the received user selections, and produces a data signal based on the processed user selections. Controller 410 provides the data signal to data interface 417, within 450, for transmission to colored LEDs 430. Data interface 417 produces a control signal based on the data signal received from controller 410. In an example and referring to FIG. 1 above, system 400 represents interaction between portable computer 130 and LED light source 110 based on user selections provided to graphical user interface 133 and touch screen 134 of portable computer 130.

Figure 5:
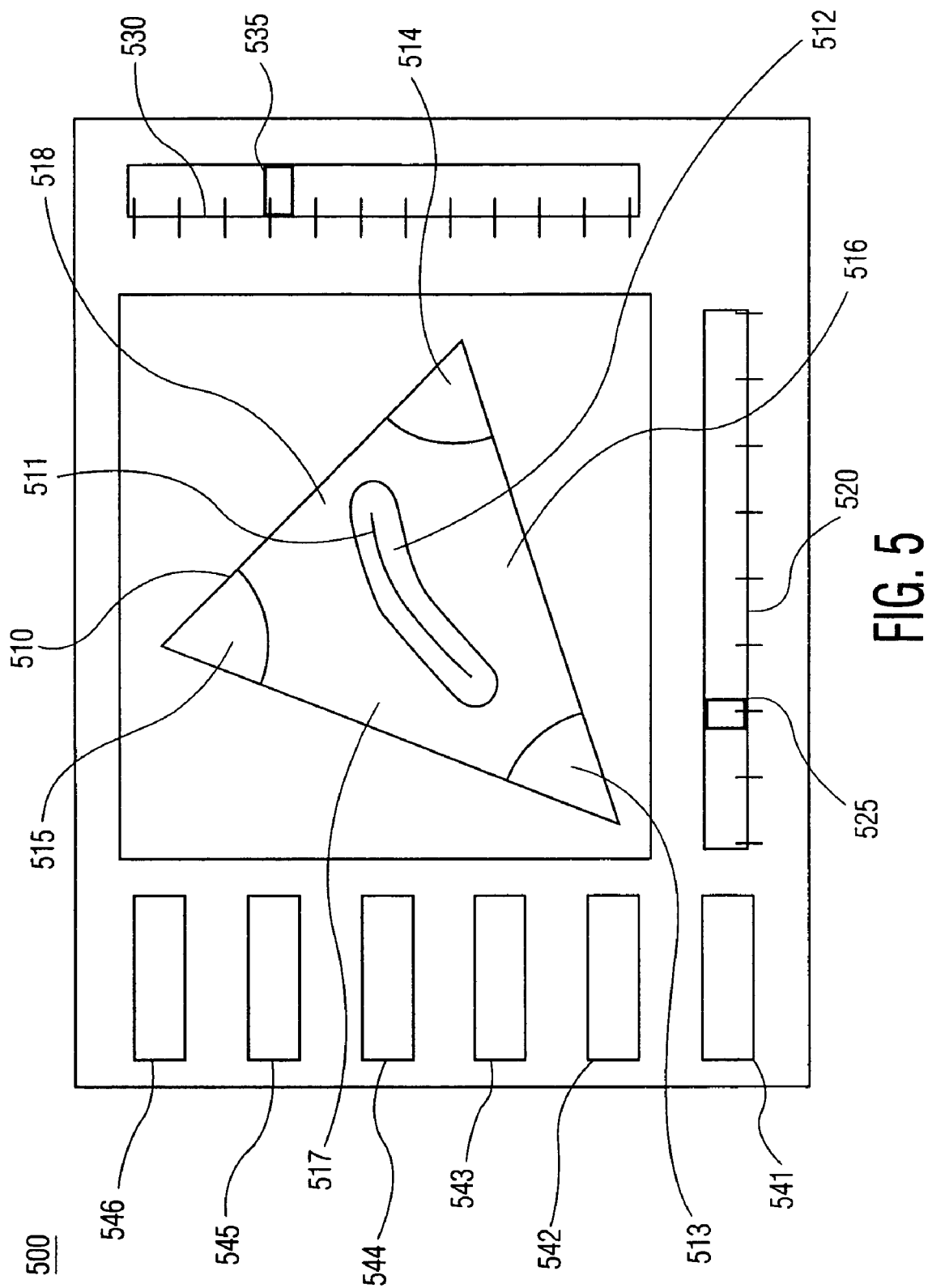
FIG. 5 illustrates one embodiment of a graphical user interface for controlling a spectral output of a LED light source in accordance with the present invention.

FIG. 5 is a diagram illustrating a graphical user interface 500 for controlling a spectral output emitted from a LED light source. Graphical interface 500 is a software component that includes a chromaticity diagram 510, a color temperature scale 520, and an intensity scale 530. Graphical interface 500 additionally includes preset color temperature buttons 541-546. Chromaticity diagram 510 includes a Planckian locus 511, a white light area 512, and color areas 513-518. Color temperature scale 520 includes a slider bar 525. Intensity scale 530 additionally includes a slider bar 535.

Graphical interface 500 is a graphical representation that allows a user to select a spectral output a LED lighting source. Chromaticity diagram 510 is a graphical representation of International Commission on Illumination ("CIE") Standard Observer. In one embodiment, chromaticity diagram 510 is a graphical representation of a Maxwell's triangle uniform color scale ("UCS"). In other embodiments, chromaticity diagram 510 is a graphical representation of a 1960 CIE UCS or a 1976 CIE UCS. Planckian locus 511 defines locations of "white" within chromaticity diagram 510. White light area 512 is an area closely surrounding Planckian locus 511 having an appearance of "white" to the unaided eye.

Color areas 513-515 are areas defining primary color areas having an appearance of blue (B) 513, red (R) 514, and green (G) 515 to the unaided eye. Color areas 516-518 are areas defining color change between a set of primary colors. Color area 516 is an area defining color change between blue (B) 513 and red (R) 514. Color area 517 is an area defining color change between blue (B) 513 and green (G) 515. Color area 518 is an area defining color change between red (R) 514 and green (G) 515.

Color temperature scale 520 is a color temperature scale that allows adjusting of a color point of white light along locus 511 utilizing slider bar 525. In one embodiment, color temperature scale 520 includes a temperature scale with a range from 2000 degrees Kelvin to 10,000 degrees Kelvin.

Intensity scale 530 is an intensity scale that allows adjusting of a dimming level utilizing slider bar 535. In one embodiment, intensity scale 530 includes an intensity scale with a range of percentages from 0 percent (no light output) to 100 percent (maximum light output). In an example, intensity scale 530 of graphical user interface 500 allows a user to adjust dimming level within a defined physical area or location, such as, for example a living room, a conference room, and the like.

Preset color temperature buttons 541-546 are preprogrammed locations within graphical user interface 500 that allow a specific color temperature to be accessed. In one embodiment, preset color temperature buttons 541-543 are preprogrammed locations within graphical user interface 500 that are preprogrammed by a manufacturer or designer to a set of specific color temperatures. In one example, preset color temperature button 541 is preprogrammed by a manufacturer or designer to the center of Planckian locus 511 and has an appearance of "white" to the unaided eye. In this embodiment, preset color temperature buttons 544-546 are programmed locations within graphical user interface 500 that are programmed by a user to a set of specific color temperatures.

Graphical user interface 500 is designed to receive user selection of spectral output(s). In one embodiment, graphical user interface 500 receives a user provided spectral output that identifies a location within chromaticity diagram 510, called a color point, and a location within intensity scale 530. Graphical user interface 500 provides color point data and intensity values to a processor for processing into a control signal that provides a user desired spectral output. The color point data is expressed as an x-coordinate and a y-coordinate within chromaticity diagram 510. The intensity value is expressed as a dimming level percentage within intensity scale 530. The processor may utilize any number of conventional methods for determining a predefined ratio of red (R), green (G), and blue (B) output necessary to match the user desired spectral output. In one embodiment, the ratio of red (R), green (G), and blue (B) output necessary to match the user desired spectral output is expressed in units of lumens. Once the ratio of red (R), green (G), and blue (B) output is determined, the output is scaled based on the intensity value. The resultant scaled output includes data necessary to produce the user desired spectral output and intensity. In one embodiment, the processor produces a control signal based on the scaled output data. In an example, the processor produces a control signal based on the scaled output data that scales direct current delivered to individual or groups of color light emitting diodes (LEDs), such as, for example direct emitting LEDs.

In summary, the current regulation of the present invention is based on varying the time average flow of current(s) (e.g, a DC level current or pulse width modulated current) through the colored LEDs to achieve a desired spectral output as opposed to a conventional regulation of providing a specified flow level of current to some or all of the colored LEDs to obtain the desired spectral output.

The above-described systems for controlling the spectral output of a LED light source are example implementations of the present invention. These exemplary implementations illustrate various possible approaches for controlling spectral output of a LED light source. The actual implementation may vary from the system discussed. For example, additional colored LEDs (e.g., amber) may be employed within a LED light source whereby diagram 510 would be having four or more sides. Moreover, various other improvements and modifications to the present invention may occur to those skilled in the art, and those improvements and modifications will fall within the scope of the present invention as set forth in the claims below.

The present invention may be embodied in other specific forms without departing from its essential characteristics. The described embodiments are to be considered in all respects only as illustrative and not restrictive.

The invention claimed is:

1. A LED lighting system, comprising:
    a LED light source including a plurality of colored LEDs operable to emit one of a plurality of spectral outputs as a function of at least one current flowing through said plurality of colored LEDs, each current of the at least one current having a variable time average flow;
    a user interface operable to facilitate a first user selection of a first spectral output from the plurality of spectral outputs; and
    a controller in electrical communication with said user interface and said LED light source to control the variable time average flow of each current flowing through said plurality of colored LEDs as a function of the first spectral output,
    wherein said user interface includes:
        a graphical user interface operable to display a chromaticity diagram encompassing a plurality of color points, each color point corresponding to one of the plurality of spectral outputs; and a touch screen operable to facilitate the first user selection of a first color point corresponding to the first spectral output.

2. The LED lighting system of claim 1, wherein the controller is in wireless communication with the LED light source.

3. The LED lighting system of claim 1, wherein said graphical user interface is further operable to display a color temperature scale including a slider bar for adjusting a color temperature of the first spectral output.

4. The LED lighting system of claim 1,
wherein said graphical user interface is further operable to display an intensity scale encompassing a plurality of intensity levels for the first color point; and
wherein said touch screen is further operable to facilitate a second user selection of a first intensity level for the first color point.

5. The LED lighting system of claim 4,
wherein said controller is further operable to scale the variable time average flow of each current as a function of the second user selection of the first intensity level.

6. The LED lighting system of claim 1, wherein the plurality of colored LEDs includes LEDs having at least four different colors.

7. The LED lighting system of claim 6, wherein the at least four colors include red, green, blue, and amber.

8. The LED lighting system of claim 1, wherein the controller is in wireless communication with the user interface.

9. The LED lighting system of claim 8, wherein the controller is in wireless communication with the LED light source.

10. A LED lighting system, comprising:
a LED light source including a plurality of colored LEDs operable to emit one of a plurality of spectral outputs as a function of at least one current flowing through said plurality of colored LEDs, each current of the at least one current having a variable time average flow;
a user interface operable to facilitate a first user selection of a first spectral output from the plurality of spectral outputs, the user interface including a touch screen operable to facilitate the first user selection of a first color point corresponding to the first spectral output; and
a controller in electrical communication with said user interface and said LED light source to control the variable time average flow of each current flowing through said plurality of colored LEDs as a function of the user selection of the first spectral output.

11. The LED lighting system of claim 10, wherein the controller is in wireless communication with the LED light source.

12. The LED lighting system of claim 10, wherein said user interface is further operable to display a color temperature scale including a slider bar for adjusting a color temperature of the first spectral output.

13. The LED lighting system of claim 10,
wherein said user interface is further operable to display an intensity scale encompassing a plurality of intensity levels for the first color point; and
wherein said touch screen is further operable to facilitate a second user selection of a first intensity level for the first color point.

14. The LED lighting system of claim 13,
wherein said controller is further operable to scale the variable time average flow of each current as a function of the second user selection of the first intensity level.

15. The LED lighting system of claim 10, wherein the plurality of colored LEDs includes LEDs having at least four different colors.

16. The LED lighting system of claim 15, wherein the at least four colors include red, green, blue, and amber.

17. The LED lighting system of claim 10, wherein the controller is in wireless communication with the user interface.

18. The LED lighting system of claim 17, wherein the controller is in wireless communication with the LED light source.

* * * * *